Nov. 24, 1959  W. G. DARLAND, JR., ET AL  2,914,595
GAS–DEPOLARIZED BATTERY
Filed Oct. 8, 1956  2 Sheets-Sheet 1
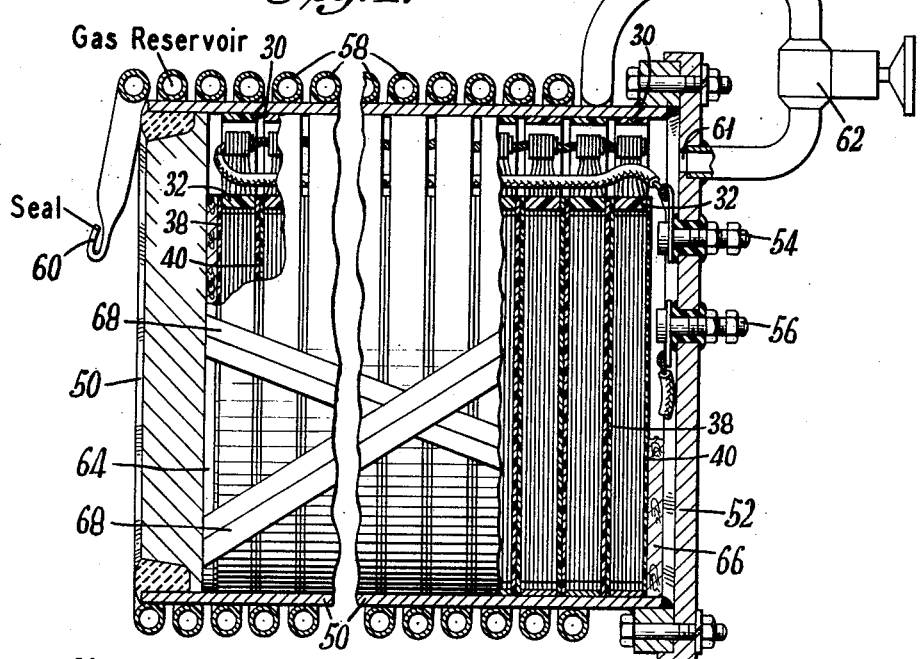
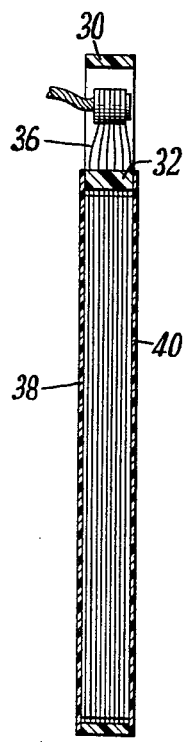
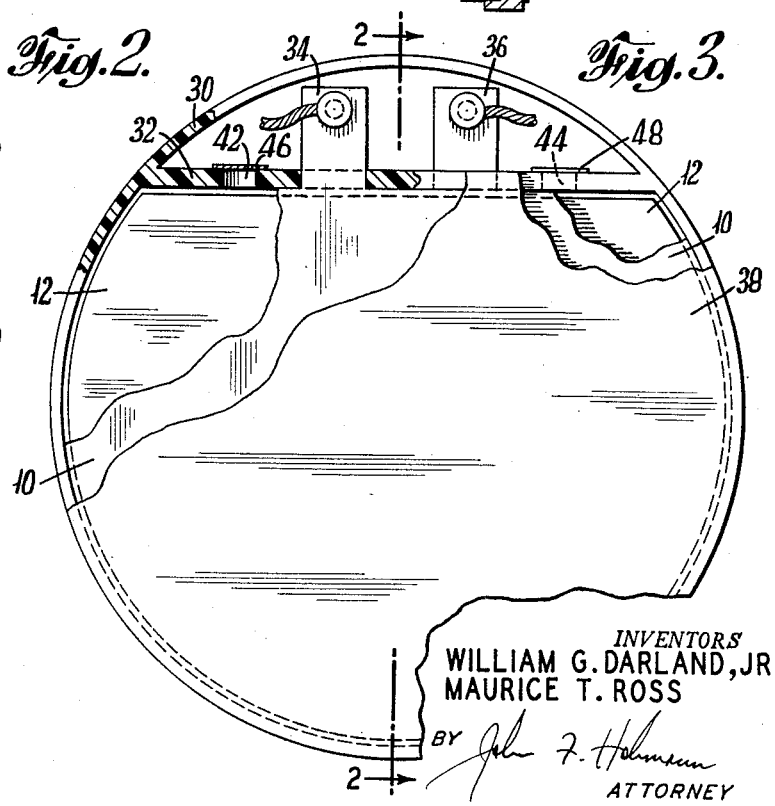
INVENTORS
WILLIAM G. DARLAND, JR.
MAURICE T. ROSS
BY
ATTORNEY

United States Patent Office 2,914,595
Patented Nov. 24, 1959

2,914,595
GAS-DEPOLARIZED BATTERY

William G. Darland, Jr., Parma, and Maurice T. Ross, Cleveland, Ohio, assignors to Union Carbide Corporation, a corporation of New York Application October 8, 1956, Serial No. 614,710

4 Claims. (Cl. 136—86)

This invention relates to gas-depolarized primary galvanic cells and refers more particularly to a construction for such cells which provides high current capacity in a relatively small cell.

Because they offer the potential advantages of extremely high current carrying capacities in proportion to the area of electrode surface, may be rapidly activated when desired, and such activation can be achieved remotely and independently of environmental features such as battery position, spin, vibration and forces of gravity, acceleration and deceleration, gas-depolarized batteries have been heretofore investigated. Considerable research and effort have been expended in attempts to produce such batteries of relatively small size, yet capable of delivering relatively great power for relatively protracted periods of time. The major problems encountered in constructions for batteries of this type are centered around the attainment of minimum cell thickness to provide the maximum possible energy density, the retention of moisture within the cell, the provision for gas entry without disrupting provision for moisture retention, the prevention of conductive bridges which result in short circuiting of cells and the design of the container for storage retention and release of the depolarizing gas.

It is the principal object of this invention to provide a cell construction which makes possible high energy density in a cell. More specifically, it is an object of the invention to provide a cell construction so thin that a number of cells may be interconnected in a small volume to provide a heavy duty power supply. Still another object of the invention is the provision of a cell construction and arrangement that can be activated in the shortest possible time upon demand.

The invention by means of which these objects are attained comprises a cell construction utilizing unusually thin components including a consumable metal anode, electrolyte immobilized by a thin separator adjacent to the anode, a moisture-resistant diaphragm adjacent to the separator to prevent the loss of moisture therefrom, a converter-depolarizer element adapted to render the depolarizing gas active to perform the depolarizing function, a water-proof diffuser element adapted to provide ready access of depolarizing gas to the converter-depolarizer element and a cathode current collector. The invention also comprises a battery composed of a number of such cells suitably interconnected. The construction of the invention will be described with reference to the accompanying drawing in which:

Fig. 1 is a vertical section of a gas-depolarized battery containing a number of cells embodying the invention;

Fig. 2 is a somewhat diagrammatic section of a pack of cells embodying the invention, the view being taken along the line 2—2 of Fig. 3;

Fig. 3 is a vertical elevation, parts being broken away, of a pack of cells embodying the invention and adapted to be interconnected with other packs of cells for assembly into the battery of Fig. 1;

Figure 4:
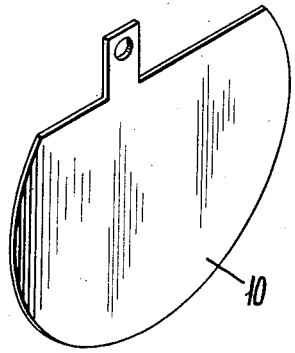
Fig. 4 is a view of an anode suitable for use in the cells of Figs. 2 and 3.
Figure 5:
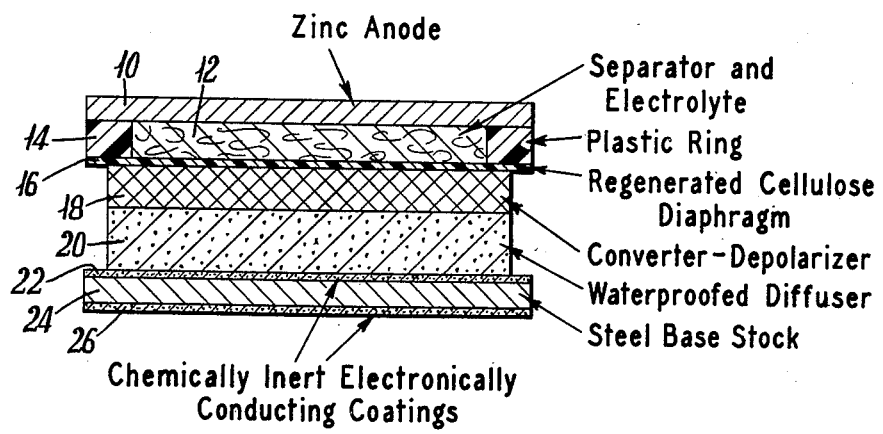
Fig. 5 is a vertical section of a cell embodying the invention.

Referring to the drawing, individual cell construction is best illustrated in Fig. 5. As there shown, in contact with a zinc anode 10, suitably of the configuration shown in Fig. 4, is a bibulous separator 12, suitably of paper or other conventional separator material such as insolubilized or supported methyl cellulose. The separator 12 is saturated with an aqueous solution of an electrolyte, and is of smaller dimension than the anode 10. A frame 14 of chlorine-resistant plastic surrounds its edges. Secured to the frame 14 and overlying the separator 12 is a diaphragm 16, suitably of regenerated cellulose. Adjacent to the diaphragm 16 is a gas-permeable "converter" element 18 of the type below described, and adjacent to the converter 18 is a water-proofed diffuser element 20 composed of fibrous material rendered electronically conductive by a carbon coating on the fibers thereof. It and the converter 18 may be one piece if desired. Adjacent to and in contact with the diffuser element 20 is a cathode current collector 22 suitably an electronically conductive carbonaceous paint applied to a steel member 24, on the other side of which is another coating 26 to serve as cathode current collector for an adjacent cell to be arranged in parallel with the cell just described.

In accordance with the invention and as illustrated somewhat diagrammatically in Figs. 2 and 3, a number of cells of the construction described are assembled in parallel to form a pack. To assemble such a pack, a ring 30, of chlorine-resistant plastic and having a chord 32 dividing the area within the ring 30 into two unequal areas is provided, into the larger of which the cells are placed. Anode and cathode leads 34, 36 project through sealed apertures in the chord 32 into the smaller area defined by the inner walls of the ring 30 and the chord 32. With the desired number of cells in place within the larger area defined by the ring 30 and the chord 32, the pack is sealed by covers 38, 40 of a material compatible with and sealable to the ring 30 and chord 32 so that the cells are totally enclosed in a sealed pack. Apertures 42, 44 in the chord 32 through which apertures chlorine will be admitted to the pack when it is to be activated, are covered by frangible diaphragms 46, 48 to prevent loss of moisture from the cells.

Referring now to Fig. 1, a desired number of packs is assembled in series relation in a suitable pressure container 50 provided with a cover 52 having insulated terminal leads, 54, 56. A coiled tube 58 encircling the container 50 serves as a reservoir for chlorine, one end of the tube 58 being sealed at 60, the other end communicating with a port 61 in the cover 52 to provide for introduction of chlorine gas to the interior of the container 50. A gas release mechanism 62, normally closed, is provided in the coiled tube 58 to prevent passage of chlorine into the container 50 until activation of the battery is desired. Endwise pressure is exerted upon the individual packs in the container 50 by end boards 64, 66 placed in opposite ends of the container 50 in contact with the end packs. The end boards 64, 66 are held in place, and the pressure maintained, by strong tape 68 (for instance of glass fiber, heavy paper, or other material not harmed by chlorine) wrapped thereabout and about the cell packs. This pressure is transmitted to the individual cell elements by the covers 38, 40 and serves to reduce internal resistance.

It will be evident from the drawing that the invention provides a remarkably compact construction for gas-depolarized cells. Although the construction is adapted to use with a number of materials, for instance any conventional anode metal such as magnesium, cadmium, aluminum or zinc being suitable, for conciseness further description will be limited to a construction utilizing a zinc anode. With a zinc anode a suitable electrolyte is an aqueous solution of zinc chloride. As is true with any electrolyte utilized in the construction embodying the invention, the zinc chloride solution is immobilized by a bibulous separator of paper, or other conventional separator material. A preferred separator is a paper composed of alpha cellulose fibers impregnated with methyl cellulose. The separator is retained within a plastic frame, and a moisture-resistant diaphragm of regenerated cellulose is utilized to maintain the separator in position and in conjunction with the plastic frame to prevent loss of moisture therefrom.

The converter-depolarizer has the function of converting the depolarizing gas to a state in which it may perform the depolarizing function, that is, in the case of chlorine for example, the converter must be capable of converting gaseous diatomic chlorine to an electrically usable depolarizing material. The converter may be composed of any gas-permeable material such as paper or other fibrous material to which has been applied an active material such as acetylene black. The diffuser element, as already pointed out, may be a fibrous material such as paper rendered electronically conductive by a material such as carbon black deposited thereon. The most satisfactory diffuser element so far found for use in the construction of the invention is that disclosed and claimed in the application of Carl A. Grulke, Serial No. 594,628, filed June 28, 1956. As above indicated, in view of the similarity of the converter-depolarizer element and the diffuser element, they may be composed of one sheet of material, one side thereof, the side intended to be adjacent to the cathode current collector, being water-proofed to prevent the presence of water which would interfere with the passage of depolarizing gas through the element.

In the cell construction of the invention the cathode current collector is preferably a thin layer of material deposited onto a steel member, the most satisfactory material being a conductive carbonaceous paint such as the type conventionally used in flat type dry cells for the same purpose. Such a material may be provided by painting, spraying, dipping or other conventional technique to the steel supporting member. Another material which may be used is lead dioxide electrically deposited on a steel member.

In accordance with the invention individual cells of the type described are interconnected in parallel rather than in series as is more conventional. The parallel connection serves two important functions in the invention. Not only does it make possible higher current drain, but equally important, it eliminates possible short circuiting between cells caused by leakage of electrolyte from one cell to another. It will be appreciated that in the case of a conventional duplex electrode, one side of which is the anode for one cell and the other side of which is the cathode current collector for an adjoining cell, escape of electrolyte from the separator adjacent to the anode surface and contact between such escaping electrolyte and the cathode current collector will cause a short circuit. In the case of a parallel arrangement, electrolyte leakage cannot form a conductive path between elements of two cells such as would cause a short circuit of the cells.

By providing a pack of parallel connected cells and then connecting a number of packs in series, desired high voltages may be achieved. The series connected packs are arranged in a pressure-tight container having a gas reservoir and means for admitting gas to the interior of the container as shown in Fig. 1 and above discussed. Because the individual cells are all enclosed in packs they may stand indefinitely inactive, moisture loss being prevented not only by the diaphragm 16 but also by the plastic ring 30, the covers 38, 40 of each pack, and the frangible diaphragms 46 and 48. When it is desired to activate the battery, the gas release mechanism 62 which is normally closed, is caused to open, permitting the depolarizing gas to escape from the coiled tube 58 through the aperture 61 into the interior of the battery container 50. The gas enters the smaller area defined by the interior walls of the plastic rings 30 and the chords 32 of each pack and causes the frangible diaphragms 46 and 48 to be destroyed permitting access of the gas to the individual cell elements. The gas is brought into intimate association with the converter-depolarizer by the diffuser element 20 permitting electrolytic action to occur.

Indicative of the capacity of cells embodying the invention, the following is cited: Cells having a zinc anode, a zinc chloride electrolyte, a carbonaceous paint cathode current collector and chlorine as depolarizing gas at a gas pressure of 30–60 pounds per square inch have a voltage of about 1.8, and a pack of 12 such cells can deliver a current of 20 amperes at such voltage for one hour with an anode area of 17.26 square inches per cell. A battery of 16 packs of such cells will have a voltage of 28 volts and will deliver 20 ampere current at 28 volts for one hour.

Utilizing the cell construction of the invention, an individual cell may be produced which is but 0.04 inch thick, and a 12-cell pack of course will be but about 0.48 inch thick.

It will be apparent from the above description that the invention is not limited to the particular electrochemical system described in detail nor to particular materials of construction, the invention offering advantages for any gas-depolarized or gas-activated cell system. In a chlorine-depolarized system, the converter element referred to above preferably contains acetylene black as already indicated. However, graphite or platinum or other such material may be used. The plastic parts of the cells and packs are composed of chlorine-resistant materials, polyvinyl chloride being a suitable and preferred resin, although phenolic and epoxy resins may be used. Since the battery container must withstand rather heavy pressure, it is composed of metal, preferably steel.

We claim:

1. A battery pack comprising a plurality of cells, each of said cells comprising a consumable metal anode; an aqueous electrolyte immobilized and maintained in position in contact with said anode by a bibulous separator, said separator being of smaller size than said anode and being so arranged as to leave a peripheral margin; an electrolyte-resistant, depolarizing, gas-resistant frame in said peripheral margin; a gas-permeable, electrolyte-insoluble diaphragm secured to said frame and overlying said separator, said frame and said diaphragm maintaining said separator in position; a converter element adapted to render depolarizing gas electrolytically active, said element being adjacent to and in contact with said diaphragm; a water-proof, gas-diffuser element providing paths for depolarizing gas to said converter element; and a cathode current collector, said cells being electrically connected in parallel and being mounted in a frame of electrolyte-resistant, depolarizing gas-resistant material; said frame being divided into two areas of unequal size by a cross-member; said cells being located in the larger of such areas and having anode and cathode terminals extending into the smaller of such areas through apertures in said cross-member; covers for the larger of such areas secured to said frame and cross-member and thereby enclosing said cells while leaving the smaller area open to the passage of gas; and at least one frangible diaphragm covering an aperture in said cross-member, which aperture provides passage for depolarizing gas to said cells when said frangible diaphragm is destroyed.

2. A pack as defined in claim 1 in which said frame is circular and said cross-member is a chord of a length less than a diameter of the circle.

3. A gas-depolarized battery comprising a sealed container, said container being divided into two areas of unequal size by a cross-member, the smaller area being open to the passage of gas, a plurality of battery packs electrically connected in series in said container and to terminals provided on the exterior of said container; a reservoir of depolarizing gas; and normally closed gas-releasing means remotely operable to permit access of of gas from said reservoir to said packs; said battery packs being composed of a plurality of cells, each of said cells comprising a consumable metal anode; an aqueous electrolyte immobilized and maintained in position in contact with said anode by a bibulous separator, said separator being of smaller size than said anode and being so arranged as to leave a peripheral margin; an electrolyte-resistant, depolarizing, gas-resistant frame in said peripheral margin; a gas-permeable, electrolyte-insoluble diaphragm secured to said frame and overlying said separator, said frame and said diaphragm maintaining said separator in position; a converter element adapted to render depolarizing gas electrolytically active, said element being adjacent to and in contact with said diaphragm; a waterproof, gas-diffuser element providing paths for depolarizing gas to said converter element; and a cathode current collector, electrically connected in parallel and maintained in sealed containers adapted to provide access of depolarizing gas to said cells when said normally closed mechanism is opened.

4. A battery as defined in claim 3 in which said reservoir is a sealed tube coiled about said container.

References Cited in the file of this patent

UNITED STATES PATENTS

| | | |
|---|---|---|
| 2,572,296 | Zimmerman et al. | Oct. 23, 1951 |
| 2,576,266 | Ruben | Nov. 27, 1951 |
| 2,615,931 | Hatfield | Oct. 28, 1952 |
| 2,639,306 | Fischbach | May 19, 1953 |
| 2,684,990 | Rappaport | July 27, 1954 |
| 2,692,905 | Fischbach et al. | Oct. 26, 1954 |